July 15, 1969  H. R. WAGENFUHRER  3,455,180
VIBRATION-DAMPING FIXING MEANS
Filed Feb. 1, 1967
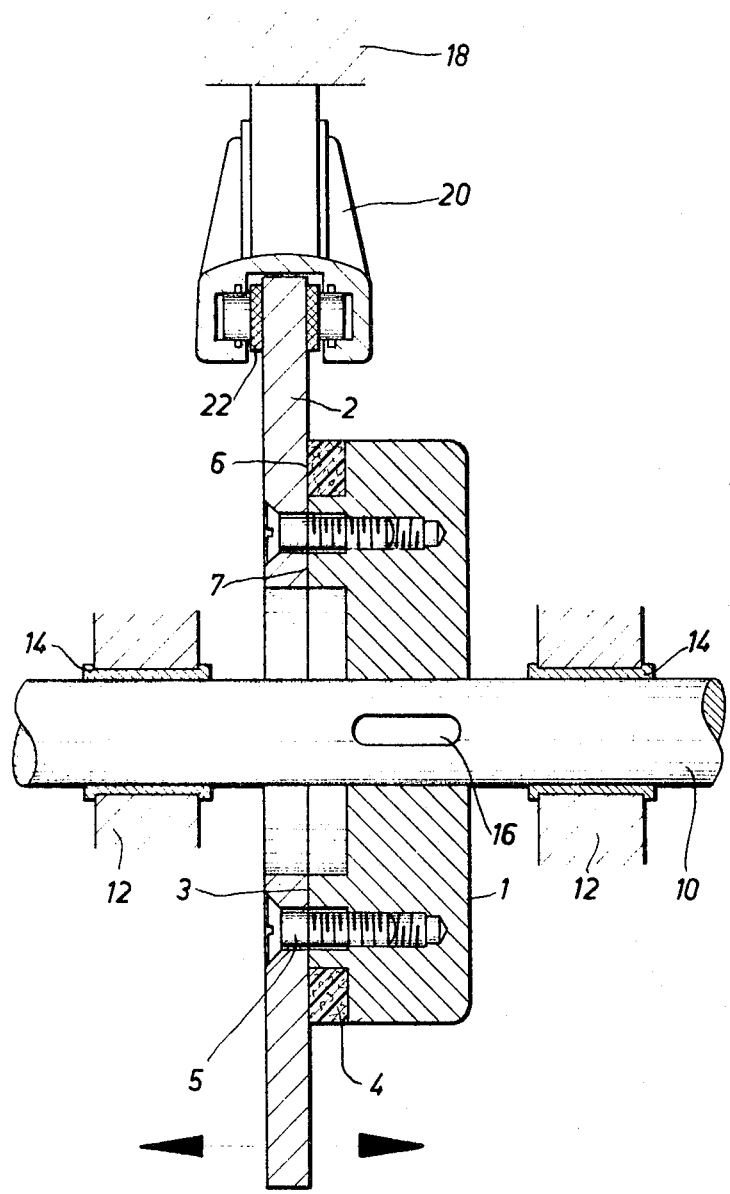
Inventor:
HEINRICH R. WAGENFUHRER
BY
ATTORNEY

United States Patent Office 3,455,180
Patented July 15, 1969

3,455,180
VIBRATION-DAMPING FIXING MEANS
Heinrich R. Wagenfuhrer, Reinbek, Germany, assignor to
Jurid Werke, G.m.b.H., Glinde, Germany
Filed Feb. 1, 1967, Ser. No. 613,190
Claims priority, application Germany, Mar. 19, 1966,
J 30,392
Int. Cl. F16f 15/12
U.S. Cl. 74—574
10 Claims

ABSTRACT OF THE DISCLOSURE

A rotary vibration damping device connected to a rotary shaft, having a central outer circular member fixedly attached to the shaft and an annular disk of a diameter substantially larger than the outer diameter of said member and having a central orifice smaller than the outer diameter of the said member, said disk concentrically mounted to the said member with its outer portion and periphery exposed outside the periphery of the said member and with its inner periphery overlapping the outer periphery of said member, said member and said disk defining with their overlapping parts two pairs of opposite radial surfaces between them, one being a pair of inner annular surfaces adjacent said shaft, and second being a pair of outer annular surfaces adjacent the periphery of said member, a rigid spacer means fixedly secured between the opposite inner surfaces of said member and said disk, said spacer means providing a clearance between the outer surfaces of said member and said disk, and elastic damping means mounted in said clearance, said damping means having a thickness slightly in excess of the thickness of said spacer means.

Field of the invention

The present invention pertains to a rotating device having a rotary shaft and a member fixedly connected to the shaft and a disk connected to the member and provides means to dampen vibrations and oscillations of the disk itself only, without affecting movements of the shaft.

Summary of the invention

The invention relates to a vibration-damping fixing means of plates which are connected by only a portion of their margin to a member which is rigid in comparison of the plate.

In particular, it is a question of annular plates which are rigidly connected to a hub by that part of the margin which is formed by the inner periphery. Such annular plates are used, for example, as brake discs. In this case, the discs rotate with the hub axle and can be braked by pressing one or more friction members against the annular surface. When the friction members are applied with pressure, vibrations occur in the form of flexural and dilational waves at the disc and are radiated therefrom, and may become apparent in the form of unpleasant noises.

It is an object of the invention to damp the sound-radiating plate in such a manner that the noises are as inaudible as possible.

According to the invention, between the plate and the rigid member there is at least one clearance which is formed by at least one distance piece at the fixing point, while a damping member of a material having a high coefficient of friction and high mechanical loss factor is also fixed in this clearance formed by the distance piece, towards the free edge of the plate. In this case, the clearance should be of the order of magnitude of the thickness of the plate. The loss factor is defined in ASTM D 2231–66, page 114 as the loss tangent, having the following equation: tan $\delta_1 = E''/E'$. Materials having a mechanical loss factor of at least 0.1, and the coefficient of friction of which amounts to at least 0.2 with respect to the material of the structural element in contact therewith, have proved suitable for a damping member. Damping members wherein fibrous materials are mutually bonded by means of polymeric materials have particularly advantageous characteristics. One example of such a material with particularly favourable characteristics is a mixture of asbestos fibres with a synthetic elastomer on a butadiene base, for example a butadiene/acrylonitrile copolymer. DIN 53513 dated December 1962 identifies a German standard of the German Material testing Office of the "Deutscher Normenausschuss."

Materials in which the modulus of elasticity has a high value are particularly favorable for the distance piece. The modulus of elasticity of the distance piece must be at least as great as that of the plate or of the rigid member to which the plate is secured through the distance piece.

The most advantageous form of fixing is obtained when the surface vector of the surface to be fixed, for example of the distance piece, lies parallel with the surface vector of the sound-radiating plate.

The distance piece causing the clearance need not be a separate part and in many applications it may be an advantage if the distance piece is either integral with the rigid member or with the plate. A further advantageous embodiment of the fixing means may consist in that the clearance is produced as a result of the fact that projections, which are integral with the plate and with the rigid member respectively, interengage alternately in a claw-like manner.

In designs in which the fixing of the plate is effected by screw connections, favourable damping conditions are obtained if the screwing means is situated as close as possible to the gripping surface. Advantageous applications are those where the screws pass through the distance pieces or the plate is screwed to the rigid member in the manner of a sleeve joint.

The initial tension at which the damping member must be installed can be determined by the fact that the damping member, which when being fixed has to be compressed to the thickness of the distance piece, has an oversize of approximately $\frac{1}{100}$ to $\frac{5}{100}$ in comparison with the distance piece, in favourable cases, measured in the clearance direction.

It is an advantage if the damping member covers as great a proportion of the area of the plate to be damped as possible. In advantageous forms of construction, the ratio of a first contact surface, which is formed at the abutment between damping member and plate, to a second contact surface, which is formed at the abutment between the distance piece and either the plate or the rigid member, was 0.2 to 5.

Brief description of the drawings

The figure of the accompanying drawing shows a disc-brake device illustrated in simplified form as an example of an embodiment of the invention.

Description of the preferred embodiments

An annular brake disc 2, which can be regarded as a vibratory plate, is secured to a hub 1 which forms a rigid member in comparison with the brake disc 2. The designation of the hub 1 as a "rigid member" means to say that the energy of vibration which is radiated is negligible in comparison with the brake disc 2. For this purpose, the hub 1 is connected to the shaft 10, being held against relative rotation, for example by means of splines 16. The shaft 10 runs in bearing bushes 14 which are mounted in pillow blocks 12. By means of the conventional brake device 20, which is mounted on a stationary wall or holding means 18, friction members 22 may be pressed against the margin of the brake disc 2 which is secured to the hub 1. In known arrangements vibrations in the form of flexural and dilational waves appear at the disc as a result of the application of the friction members with pressure, and become noticeable in the form of noise as a result of the sound radiation. The main directions of sound radiation are distinguished by arrows in the drawing.

According to the invention, there is a clearance, which is formed by a distance piece 3, between the hub 1, acting as a rigid member, and the brake disc 2. In this clearance, a damping member 4 is fixed in such a manner that the hub 1 and the brake disc are connected to one another by means of screws 5. In the connection between the hub 1 and the brake disc 2, the distance piece 3 forms the carrying and the damping member 4 the damping part. In order to ensure satisfactory fixing of the damping member 4, it is advantageous to construct this with an oversize of $1/100$ to $5/100$ in comparison with the distance piece 3.

Favourable values of the damping are further obtained as a result of the fact that the ratio of a first contact surface 6, which is between the brake disc 2 and the damping member 4, to a second contact surface 7, which is between the brake disc 2 and the distance piece 3, amounts to 0.2 to 5. The contact surface 7 may be regarded as a gripping surface at the same time.

As a result of the design according to the invention the further possibility is afforded of adapting the materials of the individual parts to the particular application in a particularly advantageous manner. For example, in the case of the disc brake, cast iron with a modulus of elasticity of 12,000 kp./cm.$^2$, was selected for the plate 2, the brake disc, steel with a modulus of elasticity of 21,000 kp./cm.$^2$ for the rigid member 1, the hub, and a similar material, the modulus of elasticity of which was likewise 21,000 kp./cm.$^2$, for the distance piece. This design had the further advantage from the point of view of the problem to be solved that the cast-iron disc had satisfactory damping characteristics in itself. A friction material resistant to high temperature with a loss factor of 0.20 and a coefficient of friction of 0.34 with repect to cast iron proved surprisingly appropriate as material for the damping member. The friction material contained asbestos fibres bonded by means of a butadiene/acrylonitrile copolymer. The proportion of binding agent amounted to 33% by weight and the proportion of acrylonitrile to binding agent was 28% by weight. For claim purposes the distance piece 3 is defined as "spacer means."

I claim:

1. A rotary vibration damping device comprising a first central disk having a central orifice, a rotary shaft of a diameter permitting protrusion of said shaft through said orifice, means to lock said shaft relative said first disk a second annular disk of an outer diameter substantially larger than the outer diameter of said first disk and having a central orifice smaller than the outer diameter of said first disk, said second disk concentrically mounted relative the said first disk with its outer portion and periphery exposed outside the periphery of said first disk, with its inner periphery concentrically forming relative to said shaft an outer radial surface and a inner radial surface opposite from and facing said first disk, a spacer means fixedly secured between the opposite inner surfaces of said first and said second disks, said spacer means providing a clearance between the outer surfaces of said first and second disks, and elastic damping means mounted in said clearance, said damping means having a thickness slightly in excess of the thickness of said spacer means.

2. A rotary vibration damping device as claimed in claim 1 wherein the clearance is of the order of magnitude of the thickness of the said second disk.

3. A rotary vibration damping device as claimed in claim 1, wherein the damping member has a loss factor of at least 0.10 and a coefficient of friction of at least 0.2 with respect to the construction material of the said first and second disks.

4. A rotary vibration damping device as claimed in claim 1, wherein the damping member comprises a mixture of fibrous and polymeric bonding materials mutually bonded said fibrous materials including asbestos fibers and said polymeric material including a butadieneacrylonitrilic copolymer.

5. A rotary vibration damping device as claimed in claim 1, the material of said spacer means having a modulus of elasticity of a value at least equal to the value of the modulus of elasticity of the said first disk.

6. A rotary vibration damping device as claimed in claim 1, wherein the ratio of a first contact surface at the abutment between the damping member and the said second disk to the second contact surface at the abutment between the spacer means and the said member amounts to 0.2 to 5.

7. A rotary vibration damping device as claimed in claim 1, said spacer means being an integral part of said first disk.

8. A rotary vibration damping device as claimed in claim 1, said spacer means being an integral part of said second disk.

9. A rotary vibration damping device as claimed in claim 1, said damping means having a thickness exceeding the width of said clearance with from $1/100$ to $5/100$ thereof.

10. A rotary vibration damping device as claimed in claim 1, the radial width of said outer surface relative the radial width of said inner surface being in proportions of about 0.2 to 5 relative to each other.

References Cited

UNITED STATES PATENTS

| 1,978,199 | 10/1934 | Harris | 74—574 |
| 2,383,400 | 8/1945 | McFarland | 74—574 |

HALL C. COE, Primary Examiner